March 5, 1940. J. W. KUHN 2,192,355
PNEUMATIC SPRING
Filed Dec. 12, 1936 6 Sheets-Sheet 3
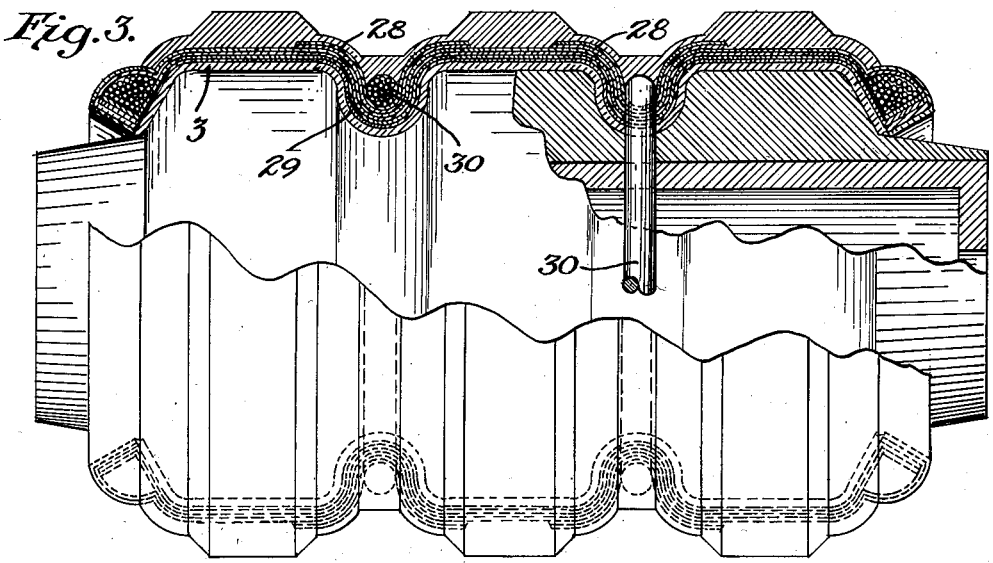
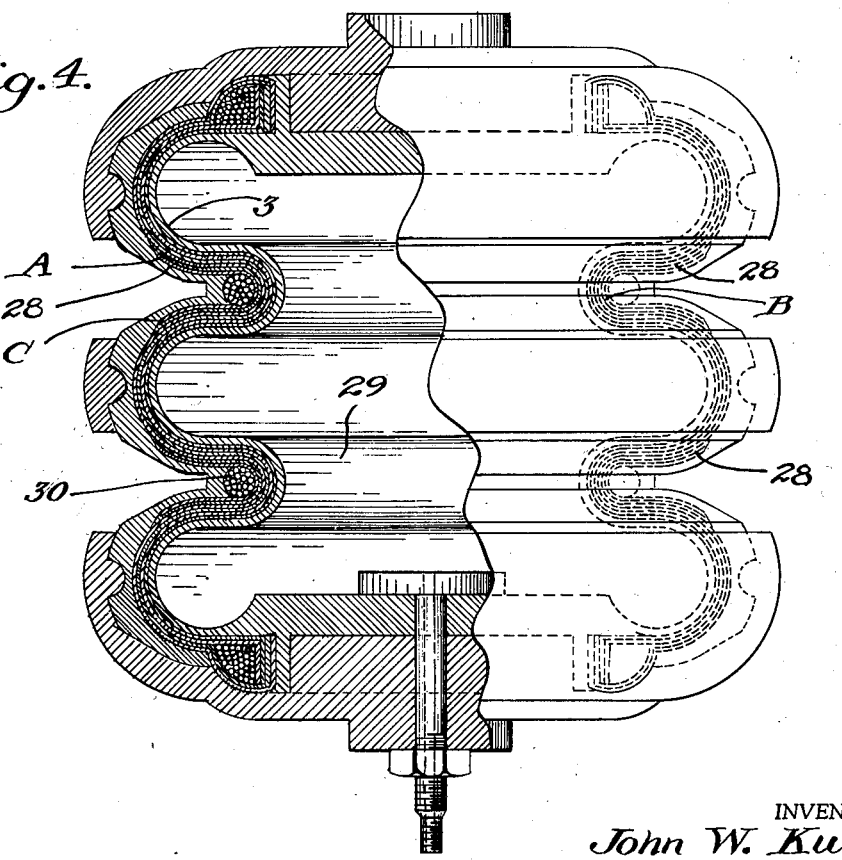
INVENTOR.
John W. Kuhn
BY
Eccleston & Eccleston,
ATTORNEYS

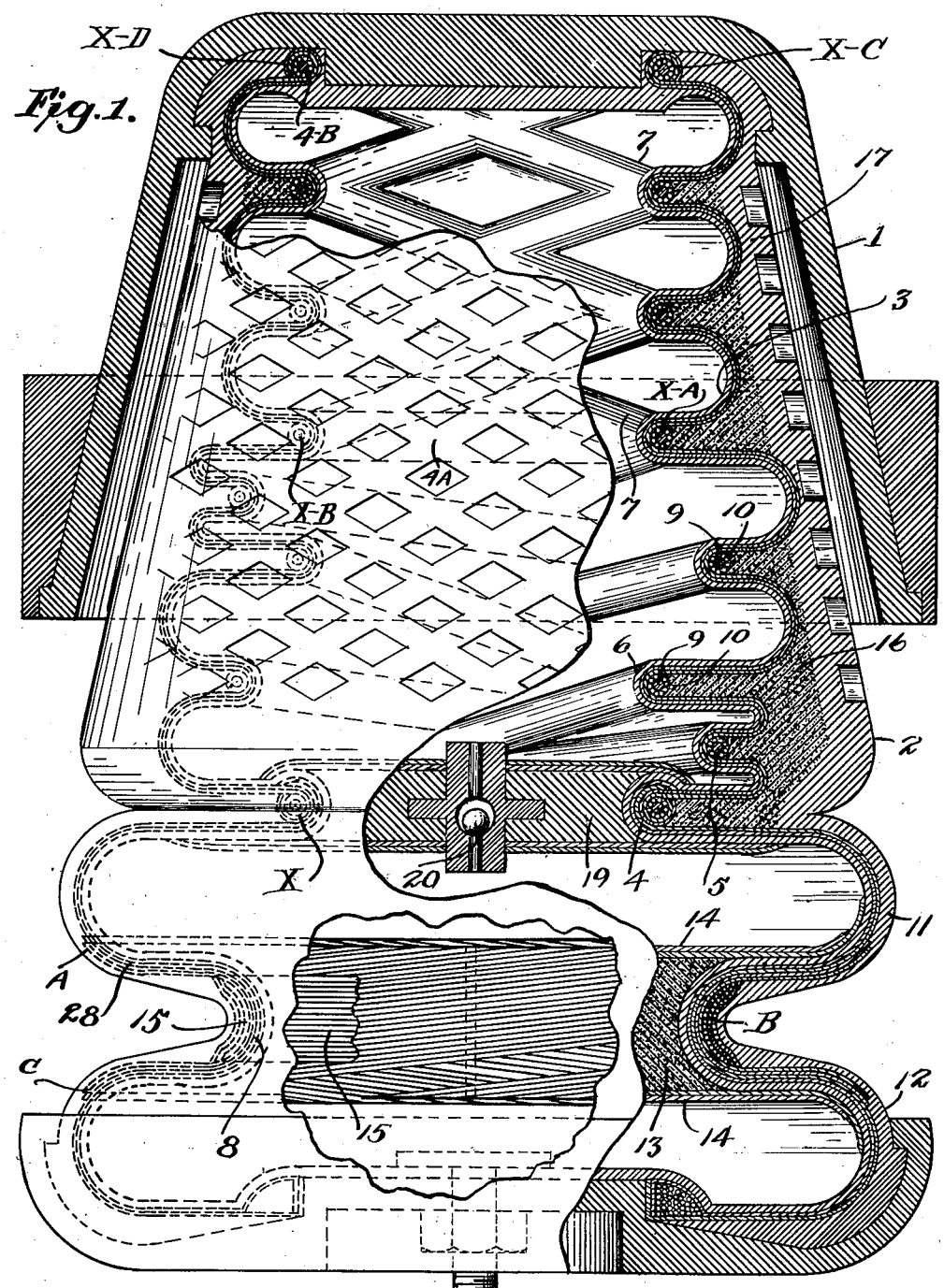

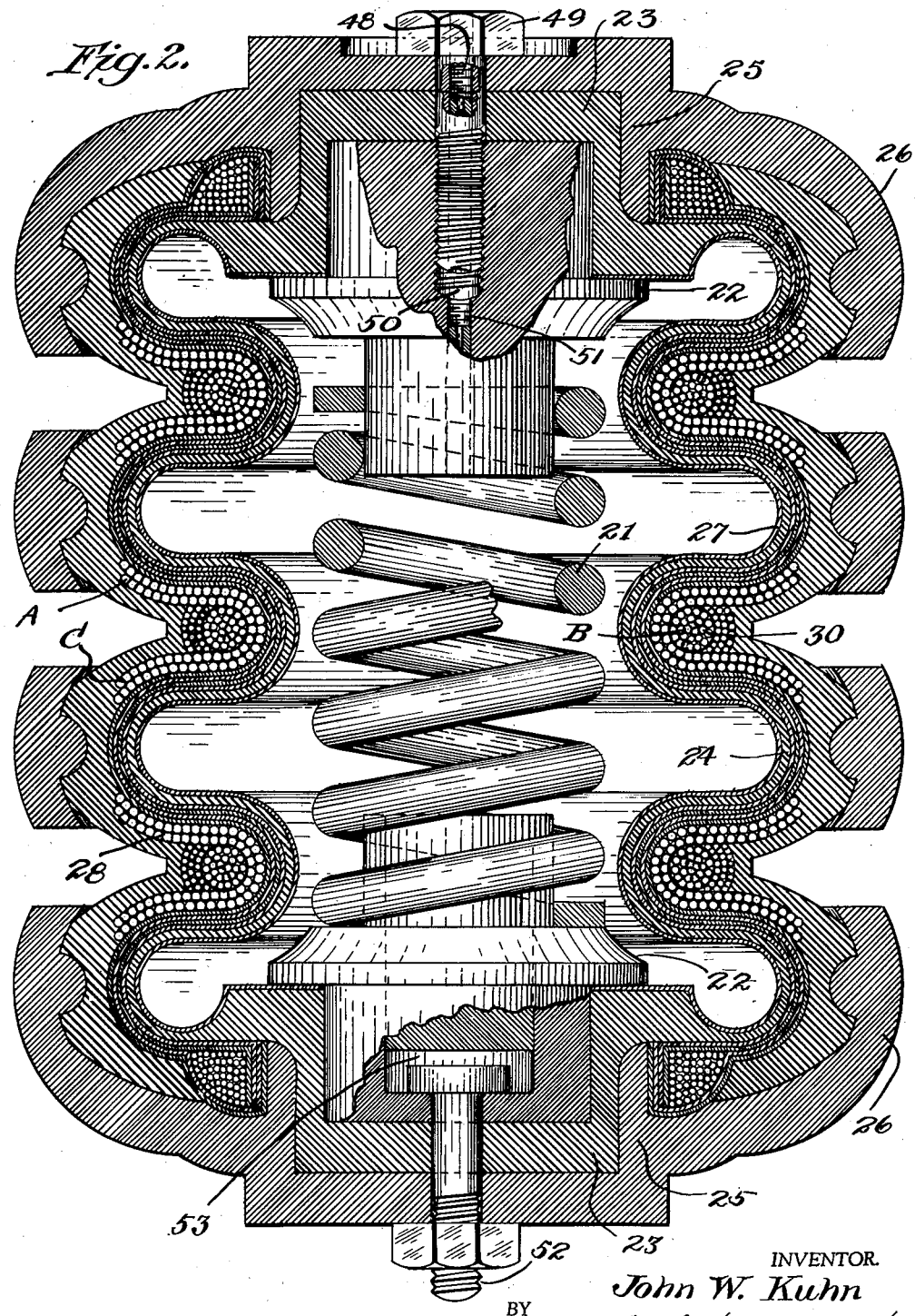

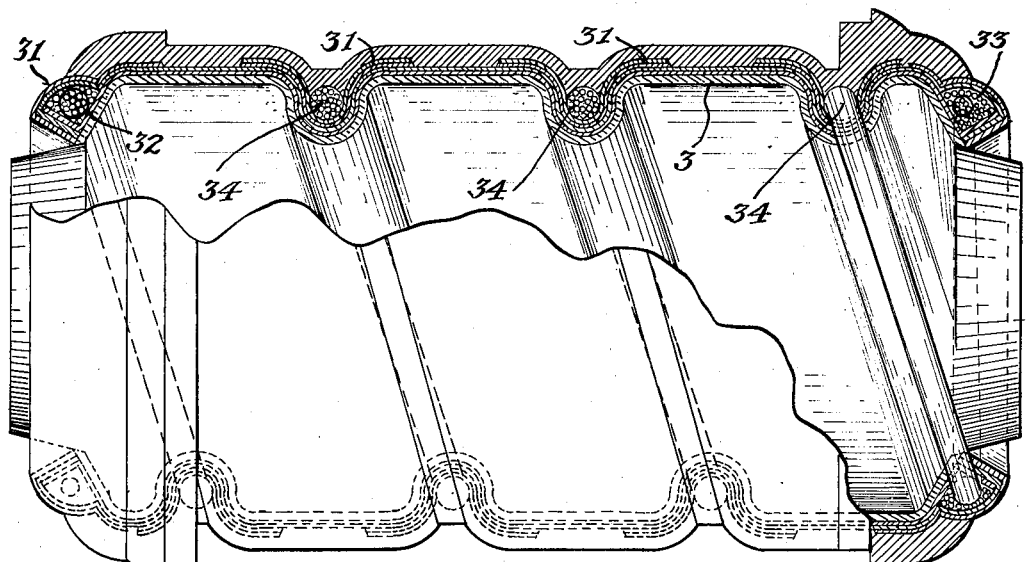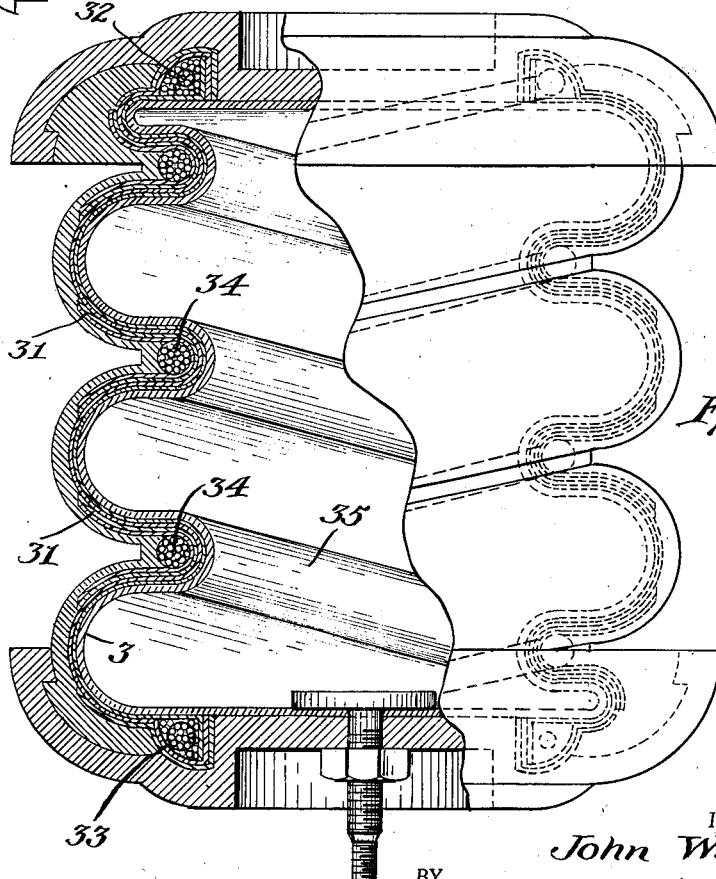

March 5, 1940.   J. W. KUHN   2,192,355
PNEUMATIC SPRING
Filed Dec. 12, 1936   6 Sheets-Sheet 5
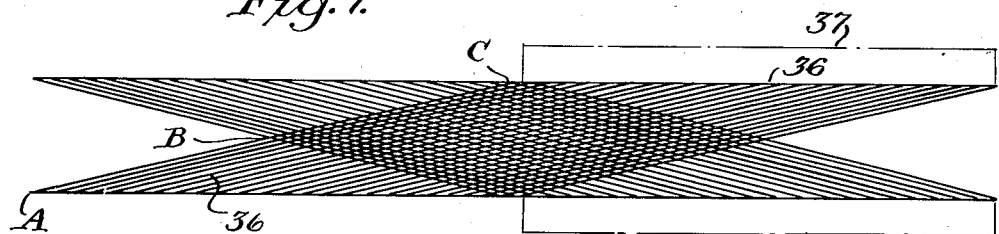
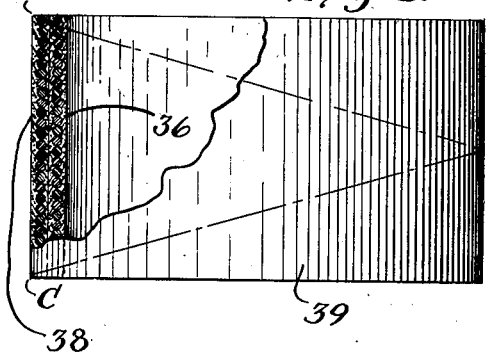 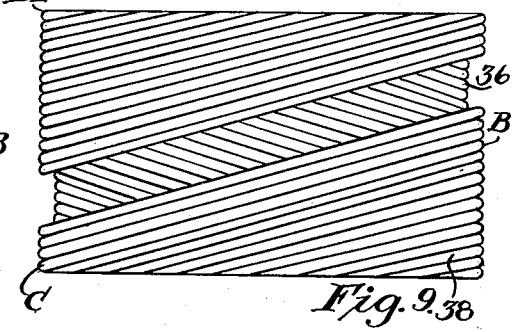
 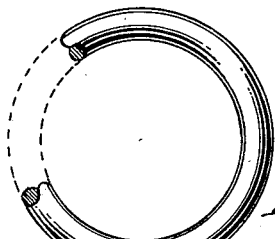
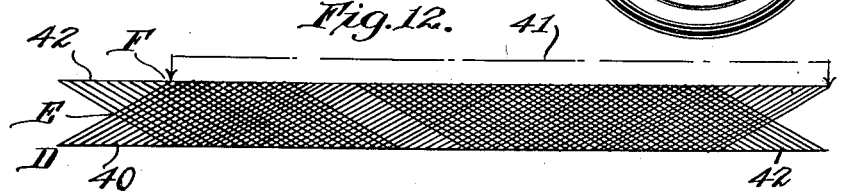
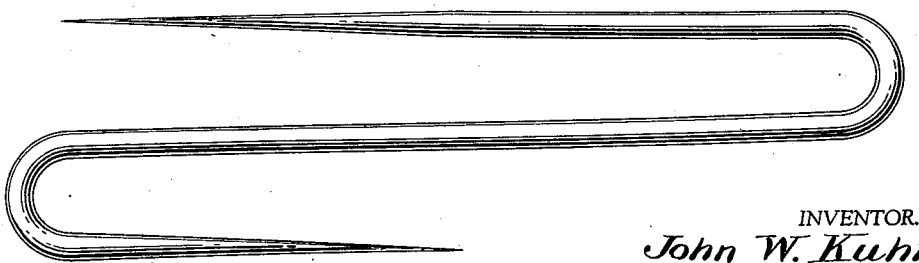
INVENTOR.
John W. Kuhn
BY Eccleston & Eccleston,
ATTORNEYS March 5, 1940.                J. W. KUHN                2,192,355
                          PNEUMATIC SPRING
                        Filed Dec. 12, 1936          6 Sheets-Sheet 6
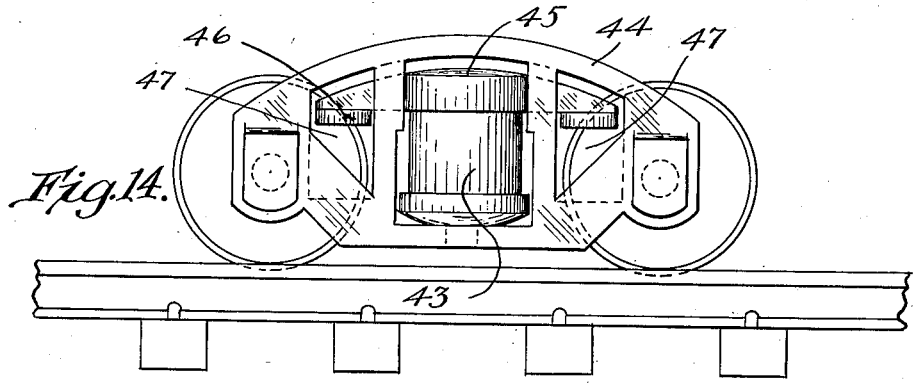
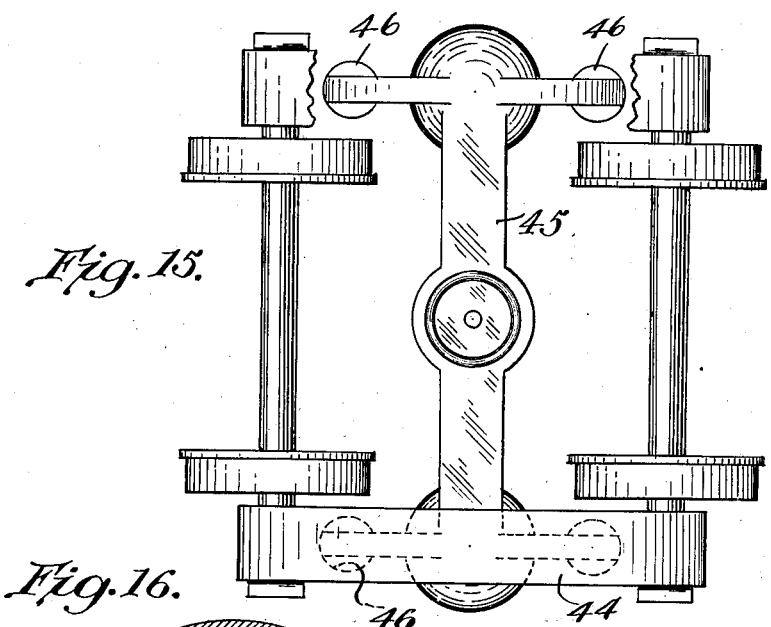
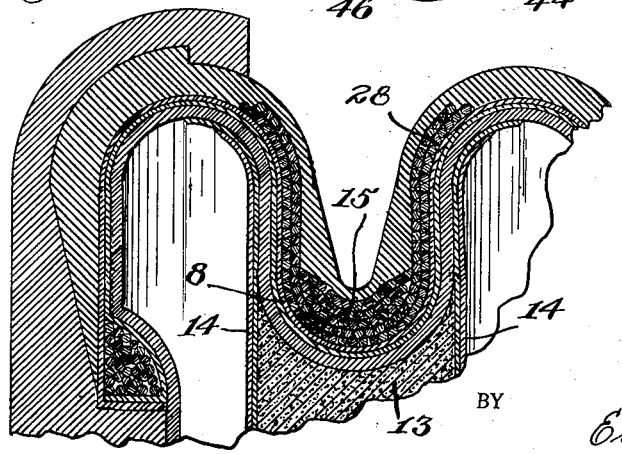
INVENTOR.
John W. Kuhn
BY
Eccleston & Eccleston,
ATTORNEYS Patented Mar. 5, 1940

2,192,355

UNITED STATES PATENT OFFICE 2,192,355

PNEUMATIC SPRING

John W. Kuhn, Akron, Ohio, assignor to The Firestone Tire & Rubber Company, Akron, Ohio, a corporation of Ohio Application December 12, 1936, Serial No. 115,616

9 Claims. (Cl. 267—35)

This invention relates to improvements on the constructions shown in Patent No. 2,056,106 and is a continuation in part of my pending application Ser. No. 91,186, filed July 17, 1936. The invention relates to improvements on air-springs and particularly to bead reinforcements and has for its primary object to provide a practical construction of compressed air-spring which may be utilized in various capacities and under various conditions, such as the suspension of automobiles, railway cars, farm machinery, and to be used in conjunction with certain types of stationary machinery.

One of the primary objects of the invention consists in the provision of a conventional metal coil spring sealed in a practical manner within the interior of a pneumatic spring proper, to be utilized as an auxiliary and emergency spring under certain conditions.

A further object of the invention resides in the provision of automatic self-snubbing springs which are designed to possess high shock absorbing qualities and to be controlled by manual or remote control to meet varying load requirements.

Another object of the invention consists in providing cord reinforcing members for springs having a long expansion stroke and a high frequency. These cord reinforcements are positioned in the beaded portions of the springs and are designed to resist internal air-pressure and retain the spring proper in its molded shape when inflated with air.

Another object of the invention resides in providing the initial reinforcing members, which are made up of a ply or plies of cord fabric, preferably an even number of plies, and cut so that the individual cords of each ply make acute angles with the horizontal, the ends of each individual cord terminating, preferably high on the side-walls of the adjacent ribs.

Another object of the invention consists in the provision of annular, endless reinforcing rope-like bands, in which the individual cords of the reinforcing members pass spirally around themselves. These endless rope-like reinforcing members are produced by employing one or more plies of cord reinforcing material formed in an endless band, and identical to that of the initial reinforcing members, these bands are then rolled upon themselves from an outer edge, forming a rope-like structure.

Another object of the invention consists in the provision of cord reinforcing members which are not limited to the annular bead construction; but on the contrary are adaptable to the spiral bead constructions. In the spiral bead designs, the cord reinforcing members are identical with that of the annular bead designs, with one exception, namely, they are not endless. In the spiral bead designs, the cord reinforcing members are wound spirally around the spiral concave beaded portion of the fabric of the casing, and exteriorly of same, with the ends of the reinforcing members merging into and embedded in annular beads. To further reinforce the beads, strips of cord fabric are utilized in which the individual cords extend lengthwise. These strips of fabric are wound around the concave grooves formed by the beaded portions of the fabric of the casing, in the grooves formed thereby and exteriorly thereof. In the annular bead type this auxiliary reinforcing cord fabric is wound in one or more layers, and in the annular groove formed by the annular beaded portions of the fabric of the casing, and in the spiral bead type, this auxiliary reinforcing cord fabric is wound spirally in one or more layers.

Another object of the invention resides in the provision of a conventional metal coil spring or group of springs, embedded in the spiral beaded portion of the fabric of the casing, and merging into annular base ends in the spiral bead type and in the portion of a spring having a spiral bead. In this manner this conventional metal spring or multiple spring serves as a reinforcing member, resists internal air-pressure exerted on the fabric of the casing, and acts as an auxiliary spring.

One of the major advantages of the cord reinforcing members, as compared with wire reinforcing members, resides in the fact that rubberized or rubber insulated cord reinforcing fabric will form a better union with the rubberized fabric of the casing than will the wire.

Other objects and advantages of the invention will be apparent from the following description when taken in connection with the accompanying drawings, in which, Figure 1 is an elevational view partly in section of one form of spring.

Figure 2 is a vertical sectional view through another form of spring and in which a conventional metal coil spring is mounted axially therein.

Figure 3 is a spring casing similar to that of Figure 2, built up on a steel mandrel in semi-flat form, and partly in section.

Figure 4 is a completed elevational view of the casing of Figure 3, and partly in section.

Figure 5 is an elevational view, partly in section, of a spiral bead spring casing built up on a mandrel in semi-flat form.

Figure 6 is an elevational view partly in section of the construction shown in Figure 5.

Figure 7 is a plan view of one of the cord reinforcing members, before being assembled into an endless band, showing two plies of cord fabric assembled together, and the acute angles of the individual cords in each ply, also showing how the individual cords of one ply cross those of the other ply and in an opposite direction.

Figure 8 is an elevational view, partly in section, of an endless band embodying the features of Figure 7 and showing a thin film of uncured adhesive rubber which holds the cords of each ply together in fabric form, and showing a cross section of some of the cords much larger than actual size in conventional cord fabric although the size of the individual cords may be varied as desired.

Figure 9 is an elevational view of the endless band of Figure 8 with the thin film coating of adhesive rubber removed, and some of the cords broken away to show the acute angles of the individual cords in the assembled endless band before being positioned in the spring proper.

Figure 10 is an elevational view, showing the cylindric form of Figure 8 partly rolled into rope-like form.

Figure 11 is a view, partly broken away, of the reinforcing member completely rolled in an endless rope-like form to provide an endless rope-like reinforcing member to be utilized in conjunction with the reinforcing member of Figure 8.

Figure 12 is a plan view of one of the cord reinforcing members taken on ⅛ scale of Figures 5 and 6 showing two plies of cord fabric assembled together with some of the cords of the outer ply broken away to more clearly show the acute angles of the individual cords in both plies. This reinforcing member is identical with that of Figure 7 with one exception, it is much longer, and is not made endless like Figure 7 but is to be wound spirally in the spiral bead spring design with the ends merging into annular beads, thereby forming the initial reinforcing member for the spiral bead structure.

Figure 13 is an elevational view of the structure of Figure 12 rolled in a rope-like form, and serves as a secondary or auxiliary reinforcing member for the spiral bead construction in which the ends of the rope-like reinforcing member merge into annular beads.

Figure 14 is a side elevational view of a railway truck of conventional design, but provided with the novel pneumatic springs.

Figure 15 is a plan view of the construction of Figure 14 showing the housing supports and connections to accommodate the pneumatic springs, and in which provision has been made for conventional metal springs to be utilized as auxiliary springs and as a safety factor.

Figure 16 is an enlarged fragmentary view of the lower portion of the construction shown in Figure 1 in which is more clearly shown the initial and secondary reinforcing members, and also the transverse reinforcing fabric.

Referring to the drawings in greater detail and especially to Figures 1 and 16, the numeral 1 indicates a metal casing which envelops the upper end of the spring member indicated generally by the numeral 2. The vertical length of the casing 1 may be varied as desired, but in Figure 1 is shown as extending over about one-half the length of the spring. The member 2 is of generally cylindrical form and is built up of tire material including conventional box-weave or cord fabric plies in the casing proper, India rubber, insulated cord and wire reinforcing material, and sponge rubber.

The pneumatic spring 2 is built up on a mandrel having the desired configuration and consists of a plurality of annular, spiral, and semi-annular beads. In building the spring a layer of rubber indicated by numeral 3, preferably India rubber such as used in conventional inner-tubes for automobile tires, is employed. This layer of India rubber is placed over and around a mandrel, the outer edges and grooves of the mandrel which correspond to the beaded formations of the casing, having been covered with a suitable cement, and then one or more rubberized and adhesive fabric plys are placed over and around the layer of rubber 3. These rubberized and adhesive fabric plies are conventional fabrics used in tire construction. The conventional cord, box-weave, and retiform fabrics may be utilized for this purpose but the cord fabric is preferable. The number of plies of fabric may of course be varied in accordance with the strength required to resist a given internal air-pressure. The several plies of material are placed over and around the mandrel to form beads 4, 5, 6, 7 and 8. Beads 4, 5, 6 and 7 are reinforced with rubberized or rubber insulated wire 9 and 10. The wire employed is preferably spring wire, and is wound in a spiral form to provide a coil spring construction to function as an auxiliary spring, and to serve as a reinforcing member for the spiral beaded portion of the fabric of the casing, thereby resisting internal air-pressure exerted on the fabric of the casing proper.

Bead 8 which is of annular form, is reinforced with cord fabric in which the normal position of the individual cords of the fabric are lengthwise. The cords are held together with a thin coating of rubber forming a fabric, and it will be noted that the fabric is cut so that the individual cords make acute angles with the horizontal. Each individual cord passes spirally around the fabric of the casing, making acute angles with the horizontal, and their ends terminating on the annular ribs 11 and 12. In each alternate layer of reinforcing cord fabric the individual cords make acute angles with the horizontal in an opposite direction, thereby serving to retain the shape of the bead. The position of one of the individual cords is indicated by letters A, B and C starting at letter A. The cord winds around the fabric of the casing from A to B, and then terminates at C. Of course this position would vary in proportion to any variation in the acute angles of the individual cords. As a further reinforcement of bead 8, sponge rubber 13 is inserted as a support for transverse reinforcing fabric 14, and to still further reinforce bead 8 a long strip of cord fabric in which the individual cords are lengthwise, is wrapped around and in the concave groove formed by the beaded portion of the fabric of the casing indicated as bead 8 but external of the fabric of the casing the same as the initial reinforcing member. Three layers of this reinforcing fabric are disclosed in this construction and are indicated by numeral 15. This construction in connection with bead 8 provides for greater resistance to internal air-pressure, greater flexibility and greater compressibility of this part of the spring.

Starting at the point X (Figure 1) which indicates a given point of annular bead 4, the spring wires 9 and 10 extend and protrude from annular bead 4 in a left hand spiral form and merge into annular bead 4—A at point X—A. These wires are a part of bead 5 and provide a spiral spring-like reinforcing member for the adjacent fabric of the casing. Bead 6 is similar to bead 5, but is of smaller diameter so as to permit the convolutions of bead 5 to overlap the convolutions of bead 6, thereby providing greater compressibility. The spiral windings of bead 6 also start at the point X and terminate at the point X—A. The beads 7 are formed by a series of rubber insulated spring wires wound in right and left-hand spiral form. The left-hand wires start from the point X—A and merge into annular bead 4—B at point X—D, and the right-hand group of wires start from point X—B and merge into the bead 4—B at point X—C. Another group or series of right and left-hand rubber insulated wires start and terminate at the same points as beads 7 and are identical, providing the diamond shape bead formations and consequent diamond shape ribs. These beads are indicated in part by dotted lines. The right and left-hand arrangement of these groups of spiral wires provides opposing forces which counteract each other when the spring is operated; thereby preventing lateral twist in this part of the casing, in addition to providing auxiliary spring-like action due to the spring wire utilized and the spiral bead formations, and reinforcing members which resist the internal air-pressure exerted on the fabric of the casing in this part of the spring. Reinforcing spring wires 10 may be replaced by soft wires or cord fabric and still retain the spring-like action of the heavy reinforcing wire 9.

The spaces between the ribs formed by beads 5, 6 and 7 are filled with highly compressible sponge rubber 16 which facilitates resilient action and compressibility of the spring in addition to forming a base for an outer rubber cover 17. The entire spring is covered with this outer layer of India rubber which protects the fabrics from moisture, abrasion, and premature decay. The outer surface of this layer of rubber 17 is provided with diamond shaped molded depressions in its exterior surface to enhance resilient action and compressibility.

The ends of the casing constitute sheets of India rubber which are continuations of the initial layer of India rubber 3, and are sealed air-tight, forming an air-tight casing. For the purpose of inflating the spring, a conventional air-valve such as used in automobile tires is inserted and sealed in the lower continuation of the initial layer of India rubber 3. This valve is indicated by numeral 18.

The spring casing described above is formed into upper and lower chambers by means of a partition 19. In this partition a ball check-valve 20 is provided to retard the flow of air from one chamber to the other; thereby providing a snubbing action in the spring. To accomplish this action the lower chamber is formed with a concave groove in its exterior surface, and the bead 8 of less cross sectional area than the beads of the upper chamber thus providing less resistance to weight in the lower chamber, and greater compressibility (or ratio or compression) to air volume. On compression the air-pressure momentarily becomes greater in the lower chamber, thereby lifting valve 20 permitting the air-pressure to slowly equalize in the two chambers. On the rebound valve 20 closes by gravity and a lower air-pressure is formed in the lower chamber, the air-pressure then slowly equalizing in the two chambers by leakage around the ball valve 20 thereby snubbing the rebound, and slightly retarding compression.

The entire casing is molded and cured in a manner similar to pneumatic tires, and is then inserted in a housing and base rim support as shown in Fig. 1.

The spring of Figure 2 is for heavy duty and is intended for railway car suspension although it is equally adaptable to trucks and buses. One of these springs of this design and a cross sectional bead area of 20 inches will support 50,000 pounds at a 150 pound (gauge) air-pressure. It is obvious that a spring of this design is not limited to light loads as in automobile suspension; but can be built to carry a high air-pressure and consequent heavy loads for a comparatively small spring.

Figure 2 is a slightly modified and enlarged view of Figure 4 and in which is sealed a conventional metal spring within the air-tight interior of the pneumatic spring proper. The metal spring 21 seats on a metal base 22, which in turn seats in a cylindrical formation formed in the continuations 23 which are a part of the initial layer of rubber 24. This layer of rubber 24 is similar to the layer of rubber 3 of Figure 1. The rubber formations 23 are seated in cylindrical housings 25 which are formed in the metal rims 26. The rubber formation 23 at the upper end of the spring is compressed within the cylindrical housing 25 with a bolt 49 threaded into the metal base member 22, and this bolt is hollow and interiorly threaded to receive an ordinary tire valve 48. In order to provide additional safety and to guard against air leaks an air-lock 50 is provided by housing an additional air valve 51 in the upper metal base 22. The lower rubber member 23 is secured in position by a bolt 52 having its head located in an air seal 53, and it is obvious that air valves may be placed at these points if desired. The pneumatic spring proper is allowed to slightly compress before engaging the metal spring 21, and in this manner metal spring 21 serves as an auxiliary and emergency spring, i. e., as a safety factor in case of a broken air line or a leak in the pneumatic spring. In this manner I provide a construction or design which permits the high shock absorbing qualities of air, and yet retains the safety factor of the conventional metal spring in railway car suspension although this construction is not limited to railway car suspension.

Numeral 27 indicates a fabric lining on the interior of the spring casing which functions to permit of molding the casing on air, steam or water, and numeral 30 indicates reinforcing cords for the beads of the casing.

Figure 3 shows how the annular bead spring design is built up in a flat manner to facilitate the building of the spring. Or, perhaps we should say, the spring is built up in a flat manner and then shaped and molded to form as in Figure 4. As a means to reinforce the beaded portions of the fabric of the casing of the spring Figures 3 and 4 cord fabric is utilized as heretofore described. The bead reinforcing member 28 of these figures is identical with that of Figure 1, which is also indicated by numeral 28. Also, this reinforcement is shown on a larger scale in Figure 2 in conjunction with the wire reinforcing members. Reinforcing members 28 of Figures 3 and 4 are also shown in Figures 7, 8 and 9, which show the specific construction. These reinforcing members 28 reinforce the beaded portions of the fabric of the casing indicated by numeral 29, and the beads 29 are further reinforced with rope-like reinforcing members 30. These rope-like reinforcing members have been described above and are shown in Figures 10 and 11. Figures 7, 8 and 9 which show the construction of reinforcing members 28 also disclose the first three (3) stages in building the reinforcing members 30 which are then completed as shown in Figures 10 and 11.

Figures 5 and 6 show how these cord reinforcing members are utilized in conjunction with the spiral bead embodiment of the invention. Numeral 31 is a reinforcing member which is more clearly shown in Figure 12, and described above, and is identical with the reinforcing member of Figure 7 with the exception that it is longer and of sufficient length to wind spirally and exteriorly around the fabric of the casing, and in the spiral beaded portion thereof, starting at annular bead 32 and merging into annular bead 33. The auxiliary reinforcing member 34 winds spirally around the fabric of the casing but exteriorly of the initial reinforcing member 31, starting at annular bead 32 and merging into annular bead 33. This reinforcing member 34 consists of a strip of cord fabric as shown in Figure 12 rolled and formed in a rope-like reinforcing member as shown in Figure 13. The two reinforcing members 31 and 34 reinforce the fabric of the casing and are spirally wound in the spiral beaded portion of the fabric of the casing indicated by numeral 35, thereby resisting internal air-pressure exerted on the fabric of the casing.

The casing proper is built up in flat form as shown in Figure 5, and is then sealed at each end with rubber continuations of the initial layer of India rubber similar to that of Figure 1 and indicated by numeral 3. That is, the ends of the casing are sealed after the casing proper is removed from the mandrel on which it is built. The casing proper is then molded and cured in the form as shown in Figure 6.

The initial layer of cord fabric of the reinforcing member shown in Figure 7 is indicated by numeral 36 and arrows 37; one of the individual cords is indicated by letters A, B and C of Figure 7. In the top layer of cord fabric 38 the individual cords extend at a sharp angle to those in the lower layer. The position of one of the individual cords A, B and C is shown in Figure 1.

In Figure 8 is shown an endless band formed of the double fabric shown in Figure 7. The cross sectional portion of Figure 8 shows the cords on a large scale, and the thin coating of conventional adhesive insulation rubber 39 which holds the individual cords together and in a fabric form. Letters A, B and C of Figure 8 show the position of the individual cord A, B and C of Figure 7.

Numeral 36 of Figure 9 indicates the initial layer of fabric also indicated by numeral 36 of Figures 7 and 8. Numeral 38 of Figure 9 indicates the top layer of fabric with some of the cords torn away to show the relative angle of the cords of the initial layer of fabric 36. Letters A, B and C of Figure 9 show how one of the cords passes spirally around the annular reinforcing member.

In Figures 10 and 11 is shown the reinforcing band of Figure 8; modified to produce a rope-like construction. In Figure 10 the band is partly rolled and in Figure 11 it is shown in completely rolled form. It is obvious that the individual cords will wind spirally around themselves in a right and left hand spiral form, and it is to be noted that these annular reinforcing bands are made spliceless by the cord formations.

Figures 12 and 13 show spiral bead reinforcing members. In Figure 12 the initial layer of cord fabric is indicated by the numeral 40 and the arrows 41. This layer of fabric is identical with the initial layer of fabric 36 of Figure 7 indicated by arrows 37, with the exception that it is longer and is of sufficient length to wind spirally around the spiral bead in Figures 5 and 6. The individual cord position indicated by letters D, E and F of Figure 12 is identical with the individual cord position A, B and C of Figure 7. The top layer of cord fabric 42 of Figure 12 compares with 38 of Figure 7. The individual cords designated by letters D, E and F of Figure 12 when positioned in the spiral bead construction will be almost identical in relative position with the cords indicated by letters A, B and C of Figure 7 in the annular bead construction.

Figure 13 shows how the reinforcing band or member of Figure 12 is rolled into a rope-like reinforcing member. The individual cords of this member compare with the individual cords of the annular rope-like reinforcing member, that is, the cords wind spirally around themselves in a right and left hand spiral form.

Figures 14 and 15 show how the pneumatic springs as described and shown in Figure 2 can be utilized in conjunction with railway car suspension. Numeral 43 designates the pneumatic springs positioned in redesigned side-frames of the conventional type and indicated by numeral 44. The side-frames 44 support the lower ends of springs 43, and the upper ends of the springs 40 engage the ends of the truck-bolster 45. The pneumatic spring 43 is positioned in a similar manner to conventional metal springs now in common use. On the ends of truck bolster 45 I have provided extension arms 46 which engage the upper ends of conventional metal springs (not shown) which are to seat in the hollow spaces 47 of the side frame 44. In this manner the pneumatic spring 43 can be made to carry the load, and the conventional metal springs which are to be positioned in the hollow spaces 47 will provide safety in case of a broken air line and act as auxiliary springs when desired.

The operation of the improved spring construction has been fully described in connection with the description of the construction, and hence need not be further referred to.

In accordance with the patent statutes I have described what I now believe to be the preferred form of construction, but inasmuch as various minor changes may be made in the details of construction without departing from the spirit of the invention it is intended that all such changes be included within the scope of the appended claims.

What I claim is:

1. A pneumatic spring device including an inflatable casing built up of tire material and molded to form a spiral bead and a spring wire of spiral form disposed in said bead.

2. A pneumatic spring device including an inflatable casing built up of tire material and molded to provide right and left handed spiral beads, the convolutions of one spiral bead overlapping the convolutions of the other spiral bead, and reinforcing material in said beads.

3. A pneumatic spring device including an inflatable casing built up of tire material and molded to form right and left handed spiral beads and annular beads, and right and left handed spiral reinforcing members disposed in said spiral beads and merging from and into said annular beads.

4. A pneumatic spring device including an inflatable casing built up of tire material and molded to form a spiral bead, and highly compressible sponge rubber mounted in the external spaces between said beads.

5. A pneumatic spring device including a casing built up of tire material and molded to form a spiral bead, sponge rubber mounted in the external spaces between the beads, and an outer covering of dense rubber for said casing.

6. A pneumatic spring device including a casing built up of tire material and molded to form a plurality of convolutions and an intermediate annular reinforcing bead, said spring adapted to support a load between the ends thereof, a rubber partition mounted in said casing and secured to the bead to form upper and lower compartments, and an automatic valve mounted in the partition.

7. A pneumatic spring device including a casing built up of tire material, said spring adapted to support a load between the ends thereof, a valved partition dividing the casing into upper and lower compartments, the lower compartment having a greater cross sectional area than the upper compartment.

8. A pneumatic spring device including a casing built up of tire material and provided with a plurality of annular ribs and an interposed bead, a layer of rubber having a thickness substantially equal to the thickness of the bead positioned within the bead, and a transverse sheet of reinforcing fabric mounted on the rubber and connected to the inner surface of one of the ribs.

9. A pneumatic spring device including an inflatable casing built up of tire material and provided with a spiral bead and annular beads, said annular and spiral beads being reinforced with inextensible cord reinforcing members, the individual cords of the reinforcing members being covered with a coating of rubber, thereby providing compact beads, and a strong union with the fabric of the casing when molded and cured.

JOHN W. KUHN.